United States Patent Office 3,542,762
Patented Nov. 24, 1970

3,542,762
PROCESS FOR RIFAMYCINS
Anacleto Gianantonio, Aldo Fabrucci, Sergio Sacerdoti, and Alexandra Soutzo, Milan, Italy, assignors to Lepetit S.p.A.-Gruppo per la Ricerca Scientifica e la Produzione Chimica Farmaceutica, Milan, Italy
No Drawing. Filed May 21, 1968, Ser. No. 730,902
Claims priority, application Italy, June 7, 1967, 16,925/67
Int. Cl. C07c 47/18
U.S. Cl. 260—210                              4 Claims

ABSTRACT OF THE DISCLOSURE

The invention is concerned with an improved method for preparing 3-formyl-rifamycin SV and its condensation products with primary amines and hydrazines.

---

The invention is concerned with a new process for rifamycins.

In the French Pat. No. 1,457,435 a new class of 3-formyl-rifamycin SV derivatives is described, of formula:

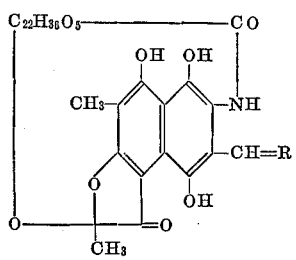

wherein R represents oxygen, H(OH), dialkoxy, imino, substituted imino, hydrazono and substituted hydrazono. In such French Patent a process for preparing these derivatives by mild oxidation of a 3-amino-methyl-derivative of rifamycin SV is described, obtaining the 3-formyl-rifamycin SV, which by treatment with an aliphatic, aromatic or heterocyclic primary amine, or hydroxylamine, hydrazine or substituted hydrazine leads to compounds of the above indicated formula, wherein R represents imino or substituted imino, hydrazono or substituted hydrazono.

Although the process described and claimed in the French Pat. 1,457,435 represents a useful and industrial method for the preparation of the compounds, we have now found that, when compounds of the above indicated general formula are desired, wherein R is oxygen, a substituted imino radical, hydrazono or substituted hydrazono, a much more convenient process can be used. This process forms the subject-matter of the present application.

According to the new process, a rifamycin, specifically rifamycin S or SV, is contacted with 1 to 4 equimolecular amounts of formaldehyde and of a primary amine, eventually after previous formation of the aldimine, in the presence of an excess of the same primary amine in a solvent at a temperature between room temperature and the boiling temperature of the solvent, in the presence of an oxidizer. Although it has been found that a large variety of oxidizers can be used, such as manganese dioxide, atmospheric oxygen and many others, when rifamycin S, with quinonic structure, is selected as starting substance, this one acts as oxidizer. However, also in this case, the addition of an other oxidizer enhances the reaction speed and its completion. The duration of the reaction depends upon the selected temperature; the lower the temperature, the longer is the reaction time. Generally, a period of treatment of 3 to 72 hours gives the best results.

Amines which can be used for the condensation are, among others, the following: ter-butylamine, ter-octylamine, neopentyldimethylcarbinylamine, isoheptyldiethylcarbinylamine, octylethylpropylcarbinylamine, α-α-dimethylbenzylamine, 1,8-diamino-p-methane, 1 - methyl-1-aminocyclohexane, 2,5-diamino-2,5-dimethylhexane.

The reaction mixture, after eventual removal of the excess of oxidizer, is poured into an inert organic solvent immiscible with water and water then added; the mixture is adjusted to a pH of about 7, the aqueous layer is separated, the organic layer dried and treated with 2 equimolecular amounts of a substituted or unsubstituted hydrazine. The hydrazono derivative of 3-formyl-rifamycin SV is obtained in practically quantitative yield, in the form of the salt of the starting primary amine, from which it is set free according to conventional methods.

In the course of the process, if it is desired, it is possible to isolate some intermediate compounds. For instance the reaction product of the selected rifamycin with formaldehyde and primary amine, eventually in the presence of oxidizers, can be isolated at the end of the intermediate reaction, before treating with hydrazine, by evaporating to dryness the organic solvent and recrystallizing the residue from a suitable solvent. This intermediate, which is present in quinonic form, can be converted into its hydroquinonic form by treatment with ascorbic acid. The hydroquinonic form, treated with an about equimolecular amount of a substituted or unsubstituted hydrazine, provides the end products described above by a more direct route. Alternatively, the hydroquinonic form can be hydrolized with acids into 3-formyl-rifamycin SV, already known as intermediate for the preparation of the end compounds.

EXAMPLE 1

A mixture of 13 g. of rifamycin S, 6.05 ml. of ter-butylamine, 3.1 ml. of 39% aqueous formaldehyde, 7.4 g. of manganese dioxide and 130 ml. of tetrahydrofuran is heated for 16 hours at 45–50° C. After filtering the solid, the filtrate is poured into 350 ml. of ethyl acetate and 180 ml. of water, adjusted to a pH of about 7.0 by adding dilute sulfuric acid and the organic layer is separated, washed, dried and concentrated in vacuo to a volume of about 100 ml. An amount of 4.3 g. of 1-amino-4-methyl-piperazine is added and the mixture is maintained for 2 hours at room temperature. By dilution with petroleum ether the ter-butylamine salt precipitates, from which according to conventional methods the 3-(4-methyl-1-piperazinyliminomethyl)-rifamycin SV can be isolated in practically quantitative yield. M.P. 183–188° C. (with decomposition).

From the ethyl acetate solution, obtained as above indicated, before adding 1-amino-4-methyl-piperazine, it is possible to isolate the 3-ter-butyliminomethyl-rifamycin S in practically quantitative yield. The compound has the following partial formula:

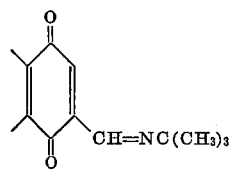

The compound, recrystallized from a mixture of carbon tetrachloride/acetone, decomposes between 150 and 170° C. The microanalysis data correspond to the above indicated formula. $\lambda_{max}$ 555 mμ, ε 10.500 (in methanol containing 1% of ascorbic acid). The polarographic analysis presents a reduction wave with $E\frac{1}{2} = -0.10$ in a mixture 1:1 of methanol and acetate buffer pH 5.4. pK 7.6 (NaOH 0.1 N in methyl Cellosolve:water 4:1).

EXAMPLE 2

After having proceeded as in Example 1 and having removed the solid by filtering, a solution of 13 g. of ascorbic acid in 65 ml. of 8% (w./v.) aqueous sulfuric acid is added to the filtrate. After standing 2 hours at 45–50° C. the reaction mixture is poured into 350 ml. of ethyl acetate and 120 ml. of water, the organic layer is separated and washed to neutrality, dried and concentrated in vacuo to a volume of about 100 ml. By adding an about equimolecular amount of 1-amino-4-methyl-piperazine, a precipitate of 3-(4-methyl-1-piperazinyl-iminomethyl)-rifamycin SV is soon obtained.

EXAMPLE 3

The preparation is carried out as described in the preceding examples, replacing the ter-butylamine with 9.5 ml. of ter-octylamine and protracting heating for 36 hours.

EXAMPLE 4

A mixture of 10 g. of rifamycin S, 3.7 g. of Schiff's base obtained from condensing equimolecular amounts of ter-butylamine and formaldehyde, 1.1 g. of ter-butylamine, 5.5 g. of manganese dioxide and 100 ml. of tetrahydrofuran is refluxed for 6 hours. After filtering the solid, the process is carried out as indicated in examples 1 or 2. The yield of 3-(4-methyl-1-piperazinyliminomethyl)-rifamycin SV is practically quantitative.

EXAMPLE 5

The process is substantially performed as described in Example 2; the reaction mixture is concentrated until the 3-formyl-rifamycin SV crystallizes, instead of pouring it into ethyl acetate and water.

We claim:

1. A process for preparing a 3-formyl-rifamycin SV derivative of the formula

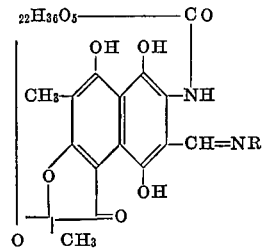

wherein NR is 4-methyl-1-piperazinyl, which comprises contacting a compound selected from rifamycins S and SV with 1 to 4 equimolecular amounts of an agent selected from the group consisting of (a) formaldehyde and a primary aliphatic amine having from 4 to 8 carbon atoms, and (b) the aldimino derivative of formaldehyde and the said primary amine in equimolecular amounts, in the presence of an excess of the same primary amine in an organic solvent at a temperature between room temperature and the boiling temperature of the solvent, in the presence of manganese dioxide or atmospheric oxygen for a period of time from 3 to 72 hours, dissolving the obtained crude product in an inert organic solvent and treating the crude product with about 2 equimolecular amounts of 1-amino-4-methyl piperazine.

2. A process for preparing an intermediate useful for the preparation of 3-formyl-rifamycin SV derivatives, said intermediate having one of the two following partial structures:

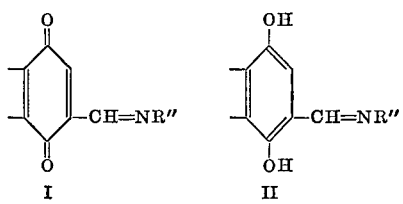

wherein =NR″ is the radical of a primary aliphatic amine of 4 to 8 carbon atoms which comprises contacting a substance selected from rifamycins S and SV with 1 to 4 equimolecular amounts of an agent selected from (a) formaldehyde and a primary aliphatic amine having 4 to 8 carbon atoms, in equimolecular amounts, and (b) the aldimino derivative of formaldehyde and the said primary amine, in a solvent at a temperature between room temperature and the boiling temperature of the solvent, in the presence of manganese dioxide or atmospheric oxygen for a period of time from 3 to 72 hours, whereby the above indicated compound of Formula I is obtained, which can be converted into the compound of Formula II by treatment with ascorbic acid.

3. A proecss as in claim 1 wherein the starting compound is rifamycin S and the obtained product is 3-(4-methyl-1-piperazinyliminomethyl)-rifamycin SV.

4. A process for preparing the 3-formyl-rifamycin SV, which comprises subjecting a compound of Formula II, indicated in claim 2 to hydrolysis with a strong mineral acid.

References Cited

FOREIGN PATENTS 1,090,115 1967 Great Britain.
1,457,435 9/1966 France.

LEWIS GOTTS, Primary Examiner

J. R. BROWN, Assistant Examiner

UNITED STATES PATENT OFFICE
CERTIFICATE OF CORRECTION

Patent No. 3,542,762     Dated November 24, 1970

Inventor(s) Anacleto Gianantonio et al.

It is certified that error appears in the above-identified patent and that said Letters Patent are hereby corrected as shown below:

Column 3, lines 37 to 49, the formula should appear as shown below:

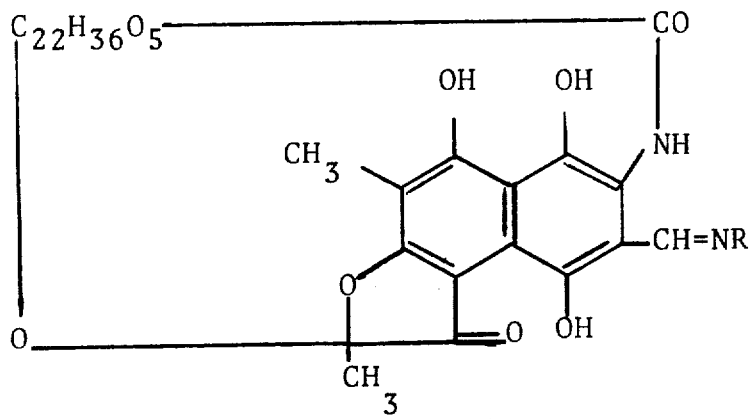

Signed and sealed this 27th day of April 1971.

(SEAL)
Attest:

EDWARD M. FLETCHER, JR.     WILLIAM E. SCHUYLER, JR
Attesting Officer           Commissioner of Patents